United States Patent [19]

Goto et al.

[11] Patent Number: 4,925,508
[45] Date of Patent: May 15, 1990

[54] MOLDLESS PROCESS FOR MANUFACTURING FOAMED ARTICLES

[75] Inventors: Fumio Goto; Taro Ogawa, both of Kurashiki, Japan

[73] Assignee: Namba Press Works Co., Ltd., Kurashiki, Japan

[21] Appl. No.: 283,929

[22] PCT Filed: Dec. 15, 1987

[86] PCT No.: PCTJP87/00980

§ 371 Date: Aug. 16, 1988

§ 102(e) Date: Aug. 16, 1988

[87] PCT Pub. No.: WO88/04604

PCT Pub. Date: Jun. 30, 1988

[30] Foreign Application Priority Data

Dec. 16, 1986 [JP] Japan .................... 61-297499

[51] Int. Cl.$^5$ .................... B32B 31/14; B32B 5/20
[52] U.S. Cl. .................... 156/79; 156/93; 156/156; 156/256; 206/524; 220/902; 264/45.2; 264/46.6; 264/46.9
[58] Field of Search .......... 156/79, 156, 93, 256; 206/524; 220/902; 264/45.2, 46.6, 46.9

[56] References Cited

U.S. PATENT DOCUMENTS 3,485,347  12/1969  McGill et al. ............. 206/524
3,641,725  2/1972   Grisell .................. 206/524 X
3,952,082  4/1976   Arnaud .................. 264/46.6
4,267,927  5/1981   English .................. 206/524

Primary Examiner—Robert A. Dawson
Attorney, Agent, or Firm—Renner, Kenner, Greive, Bobak, Taylor & Weber

[57] ABSTRACT

Moldless process for manufacturing foamed articles is disclosed wherein a trim cover is first prepared as having a composite structure of an outer facing material such as fabric and an inner backing material of low melting point such as a thin foam of polystyrene and having a shape substantially corresponding to a final contour of the finished article; the trim cover is heated and forced to form a pre-shaped cover conforming to the final contour of the finished article preferably by means of a restraining frame such as basket or plastic cage configured to the final contour of the finished article; highly reactive polyurethane composition foamable at low internal pressure is poured inside the pre-shaped cover and allowed to foam and expand to fill substantially an entire volume within the pre-shaped cover; and then the pre-shaped cover is externally heated to around the melting temperature of the backing material so as to significantly shrink and virtually dissipate the backing material interposed between the facing material and the foaming polyurethane at the same time allowing the polyurethane to further expand to adhere to and become integral with the inner surface of the facing material, thereby an integral foamed article is produced without the use of any molds.

18 Claims, 2 Drawing Sheets

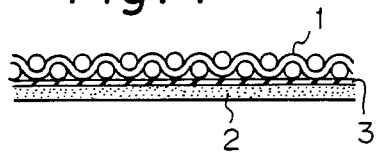
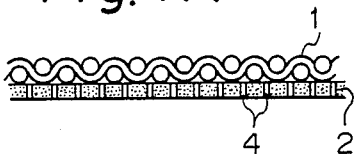
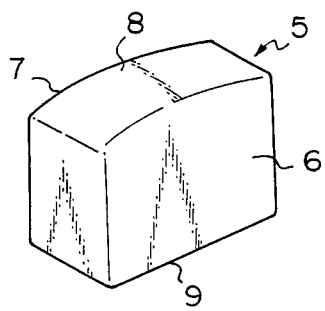
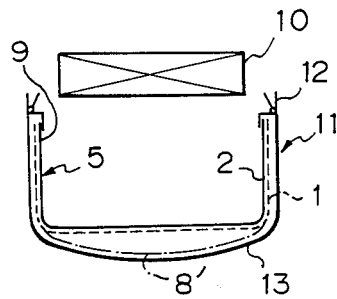
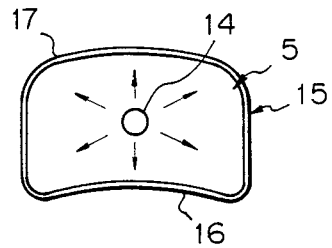
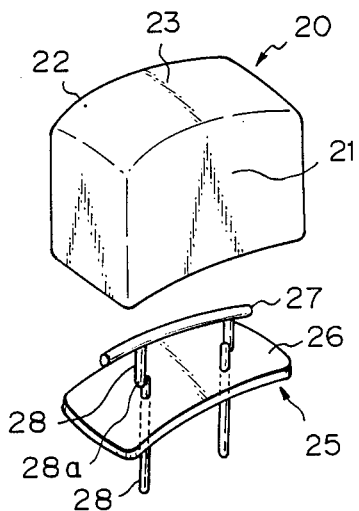

MOLDLESS PROCESS FOR MANUFACTURING FOAMED ARTICLES

DESCRIPTION

1. Technical Field

This invention relates to a moldless process for manufacturing foamed articles composed of a foamed polyurethane body and a cover material enveloping integrally the body, without the use of any conventional mold.

2. Background Art

Many foamed articles such as vehicle seat cushions, head rests, arm rests and the like are generally manufactured through the use of molds, each cavity of which is configured in conformity to an outer contour of a final product to be desired. A cover or facing material such as fabric and natural or synthetic leather is set in the mold cavity by being laid along the entire inner surface of the mold cavity and shaped so as to follow the cavity inner surface. A liquefied foamable composition is poured to the inside of the cover material which has already set in the mold cavity, and allowed to foam and expand until it reaches to and becomes integral with the inner surface of the cover. Foaming composition exerts strong pressures through the cover material against the cavity wall, and thereby adheres firmly to and integrally with the inner surface of the cover.

It has been long believed that the molds used for manufacturing foamed articles must have strong and heavy metallic structures in order to endure the strong pressure caused by foaming of compositions and to assure an accurate outer configuration of the final product. Such molds however, are very expensive to manufacture and difficult to manipulate. And further such molds require large installing space. Additionally, even if different surface configurations are required for the final products, the cavity wall shape of the conventional molds cannot be easily altered to meet such requirements.

Although the foaming compositions produce strong pressure against the cover during foaming inside the cover, they can not perform to smooth and remove wrinkles and creases which have been formed in the cover fabric at the time of setting up in the mold. Accordingly, once wrinkles are formed in the cover at the time of setting, they can not have a chance to be smoothed or removed. Thus, the setting of the fabric was a very important procedure and the fabric had to be set in such an accurate and regulated manner that it might make intimate contact with the cavity inner surface without wrinkles. This required cumbersome and time-consuming manual labor.

Moreover, the cover placed in the conventional mold may easily move out of the proper setting position prior to pouring the foaming material. Even if the fabric can be once set accurately in the mold, this setting state is only provisional but not fixed. Accordingly, the cover fabric may easily get out of its proper position by vibrations or shocks applied to the mold. However, checking of the fabric setting state is very hard during the manufacturing process. Particularly, after the lid of the mold is closed, it is impossible to check how the fabric is set in the mold. Accordingly, subsequent pouring and foaming steps of the foamable composition must be proceeded without checking of fabric setting state, running the great risk of producing defective articles.

Another problem is that the foamable composition of the prior art required considerably long time period from pouring to completing the final curing of the composition, and therefore very long and vast production line was needed for accomplishing the manufacture of foamed articles and yet only low productivity was attained.

The prior mold manufacturing has further problems as follows. Vacuuming technique is usually employed with perforations through the cavity wall in order to attract and bring the fabric into intimate contact with the cavity surface. Thus, the fabric itself must be of impermeable nature to assure attracting effect on the fabric. In this case the resultant products including arm rests, seat cushions and the like become uncomfortable because they are sticky to the touch with sweat or moisture attached and remaining on the outer impermeable surface thereof.

DISCLOSURE OF THE INVENTION

Accordingly, it is an object of the invention to provide a novel process for manufacturing a foamed article without use of any conventional mold of heavy and massive type, that is, a moldless process for manufacturing foamed articles.

Another object of the invention is to provide a process for manufacturing a foamed article using a pre-shaped cover material conforming to a final outer configuration of a product such as head rest, arm rest, seat cushion and the like, in which the shape of each cover material can be easily checked even immediately before pouring the foamable composition, and if a mal-shaped cover is found it can be readily restored by additional reshaping process so as to avoid any risk of producing defective articles.

Yet another object of the invention is to provide a moldless process which uses novel reactive polyurethane compositions having very fast reaction rate and capable of completing foaming and curing in a very short time period as compared with the prior art compositions. Novel fast polyurethane composition itself and a device for pouring the same into a pre-shaped cover material are also disclosed.

A further object of the invention is to provide a process for manufacturing a foamed article in which permeable materials can be utilized as the cover of the foamed body without any inconveniences experienced in the conventional vacuuming technique.

A feature of the invention resides in that a trim cover is first prepared and pre-shaped into a desired shape conforming to a final outer configuration of an article including, head rest, seat cushion and the like. The trim cover is composed of a surface or facing material, e.g. woven or knitted fabric, and a backing layer, e.g. a thin layer of foamed materials, adhered to the inside of the facing material. This trim cover may be prepared by attaching the low melting foamed backing material onto the inner surface of the planar facing material by adhesion etc. and then, cutting out and sewing up the facing material in accordance with the configuration of the final article. Alternatively the trim cover may be prepared by first cutting out and sewing up only the facing material and then lining the inner surface of the sewn facing material with the foamed backing material. Next, the cover may be shaped to the contour of the final article by heating and softening the low melting backing material, and then the backing material is cooled and hardened to obtain a self-supporting pre-shaped cover.

The pre-shaped cover itself formed into the contour of the final article prior to pouring the foamable polyurethane and the forming method thereof constitute a part of the present invention.

Polystyrene foam may be employed as a backing material of low melting foam, and alternatively a mixed foam of polystyrene and polyethylene also may be employed. Heating process for softening the backing material may be carried out by using a heater or blowing hot air. This hot air blow can be utilized also as pressurizing means for shaping the cover to the final article contour. After shaping, the hot air is changed to cool air to cool the backing material.

Because the backing material shaped and hardened in accordance with the present invention may support the cover in the shape of the final article contour, such pre-shaped cover acts also like a mold when a reactive polyurethane composition is poured into the cover. Thus, the poured polyurethane can foam and expand into the shape of the final article.

At the time when the polyurethane foam expands to fill substantially an entire space within the pre-shaped cover, the backing material of low melting foam is virtually dissipated. This is accomplished by externally heating the cover up to the melting point of the backing material or more. Heating causes the polystyrene foam to fuse and significantly shrink, and reduce its volume to such an extent that the foam is deemed to virtually disappear. At that time the foaming polyurethane reaches to the inner surface of the facing cover and adheres thereto.

According to another feature of the present invention, where the outer surface of the final article has a concave portion, an outer shape restraining frame or cage is required for suppressing the outer surface of the cover. This outer shape restraining frame may be used with convex and planar surfaces as well as concave surfaces. In any event, this shaping frame is completely different from the conventional mold of heavy and massive type. This restraining frame may be a basket of wire netting or a cage of transparent plastic, and therefore is light and inexpensive and very easy to handle and install. Such shaping frame is preliminarily configured to a desired final contour of the article and capable of being easily pre-formed if minor changes are required in the final contour. Heat and pressure are applied to the inside of the trim cover received in the shaping frame in order to soften the backing material and press the cover against the frame to obtain a desired pre-shaped cover. The backing layer reaches its melting point and gets virtually dissipated around the time the inner space is entirely filled with polyurethane. The basket or transparent cage as shaping frame allows checking whether or not the pre-shaped cover is in good condition for receiving pouring of reactive polyurethane composition.

It is important to select desirable reactive polyurethane compositions for carrying out the moldless manufacturing process of the present invention. Preferable foam materials are ones which have low foaming pressures and fast reaction rates. In accordance with the present invention, such reactive polyurethane composition having a considerable high viscosity is delivered inside the pre-shaped cover. To accomplish this, a novel pouring nozzle may be used for discharging such viscous compositions. The pouring nozzle may be inserted through the cover to the inside thereof. The pouring nozzle has a predetermined length of residential passage within which the reactive polyurethane compositions flow slowly enough to change from liquid state into creamy state and get a desired viscosity. This pouring nozzle also constitutes a part of the present invention.

The following formulations define reactive polyurethane compositions suitable for the moldless manufacturing process of the present invention.

| Ingredients | Parts by weight |
| --- | --- |
| Polyol (molecular weight 6000) | 60–80 |
| polyol (molecular weight 4000) | 40–20 |
| water | 1.6–7.00 |
| amines | 0.5–1.50 |
| chain extender | 0.2–1.00 |
| surfactant | 0.1–3.00 |
| cell opener | 2.0–6.00 |
| TDI/MDI* 60–80/40–20 (%) | 35.0–60.0 |

*TDI/MDI: toluenediisocyanate and methyldiphenydiisocyanate

BRIEF DESCRIPTION OF THE DRAWINGS

FIG. 1 represents a partial enlarged cross sectional view of a composite cover material to be used for fabricating a trim cover of the invention;

FIG. 1A shows a modified form of the composite cover material of the invention;

FIG. 2 represents a perspective view of a trim cover to be used for manufacturing a head rest;

FIG. 3 illustrates heating process of the trim cover for softening a backing material of the trim cover;

FIG. 4 illustrates shaping process of the heated trim cover by air blowing;

FIG. 5 shows in a perspective view a pre-shaped cover and its fittings to be inserted therein;

PREFERRED EMBODIMENT FOR CARRYING OUT THE INVENTION

Figure 6:
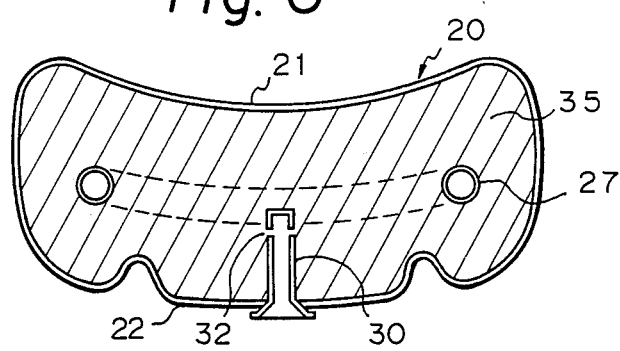
FIG. 6 illustrates in sectional view a nearly finished article (head rest) with a pouring nozzle for pouring polyurethane liquid inserted therein.

Referring now to the drawings, the present invention will be described in detail in connection with preferred embodiments.

FIG. 1 shows in a partial sectional view a composite cover material which may be employed for carrying out the present invention. The composite cover material comprises a facing material 1 and a backing material 2. The facing material 1 is preferably of permeable material such as woven or knitted fabrics, while impermeable material such as natural and synthetic leathers, polyvinyl chloride or nylon sheets may also be employed. The backing material 2 is attached to the lower surface of the facing material 1. The backing material 2 is a thin foamed product of low melting point compounds such as polystyrene. The facing material 1 and the backing material 2 may be bonded together through the use of suitable adhesive 3. Alternatively the polystyrene backing 2 may be directly stuck onto the back surface of the material 1 by foaming in situ. Preferred polystyrene to be used in the invention is commercially available under the name of "Styropor" or "Styrofoam."

In one embodiment, the backing material 2 is first applied onto the facing material 1 in a flattened or leveled state to obtain a composite cover. Next, the composite cover is cut into a desired shape and size and then sewn to form a cover shell which is used for any finished article. As an example of a finished article, a head rest for the seat or chair is taken in the following description. FIG. 2 shows a cover 5 used for a head rest. It should be noticed that the present invention is applicable to any other finished foam articles such as an arm rest, a seat cushion, a stuffed toy or doll, and the like. The cover 5 is prepared by cutting the composite cover material shown in FIG. 1 into one or more pieces of desired sizes and sewing them together to form a box-like shape or rectangular parallelepiped configuration. Thus obtained cover is called a "trim cover".

In another embodiment, the cover may be prepared by cutting and sewing only the facing material 1 into the final contour of any desired article, and then attaching suitable pieces of thin polystyrene foam to the inside surface of such facing material.

In any event, because of stiffness of the foamed polystyrene backing applied to the inside of the cover 5, the cover 5 has shape retentivity or is self-supporting to some extent. In this stage, however, the cover 5 does not have yet configurations exactly corresponding to the final product. Specifically, a surface 6 is flat and different from a concave portion 21 and a rear surface 7 is not a convex portion 22 of the final product shown in FIG. 5. A top surface 8 may be held in almost flattened condition by the foamed polystyrene backing 2 unless the latter is very thin. The cover 5 also has a bottom opening 9.

The trim cover 5 is then subjected to a shaping process which comprises the steps of heating the cover and blowing air inside the cover whereby the configuration of the cover exactly corresponding to the final product is obtained.

An example of the heating step is illustrated in FIG. 3 in which the surface material 1 is shown in broken lines and the backing 2 is shown in a solid line. Preferably, the cover 5 is inverted and supported in a frame or false frame 11 and pinched at its edges of the bottom opening 9 with clip means 12. Heating means 10 such as an electric heater is placed over the frame 11 and applies heat sufficient to bring the backing material 2 to a plasticized state, e.g. 90° C. The false frame 11 is preferably provided with a concave portion 13 so that the top portion 8 of the cover 5 when heated may hang down to conform to a final configuration desired.

The backing material 2 thus brought to plasticized state is easily deformable when external forces are applied. FIG. 4 illustrates an example of applying deforming forces to the plasticized cover 5, i.e. blowing of air. At this time, the plasticized cover 5 is received and supported within a shaping frame 15 in order to be restrained by the frame 15. The inner shape of the shaping frame 15 is corresponding to or complementary to a desired outer contour of the final product for giving a desired configuration to the cover 5. Specifically, this restraining frame 15 has a concave portion 16 and a convex portion 17 respectively to form a concave surface 21 and a convex surface 22 of a pre-shaped cover 20 shown in FIG. 5. While it cannot be seen in FIG. 4, a convex surface like the convex portion 13 in FIG. 3 is formed at the bottom of the shaping frame 15.

An air blowing pipe 14 is inserted inside the cover 5 supported within the frame 15. Air pressure is supplied through the pipe 14 to the inside of the plasticized cover 5 such as shown by arrows in FIG. 4 so that the backing material 2 and the facing material 1 are forced to inflate and internally press against the shaping frame 15 having the configuration of the final product. Thus the plasticized cover 5 obtains its outer shape perfectly equal to the final product contour to be required. The air blowing is continued until the plasticized material is cooled down and solidified in the shape conforming to the shaping frame 15. When removed from the frame 15, a pre-shaped cover 20 as shown in FIG. 5 is obtained. The cover 20 is of an outer contour having a concave front surface 21, a convex rear surface 22 and a convex top surface 23 for a desired head rest. Thus solidified pre-shaped cover 20 can maintain its desired shape, in other words, it has shape retentivity by itself or self-supporting nature.

Alternatively, a single frame member may be used for functioning as both false frame 11 and shaping frame 15. In this case, a single blowing pipe 14 may be used for first applying hot air to the inside of the trim cover 5 to soften and shape the polystyrene backing material 2 and then for applying cold air to cool and solidify the cover backing material 5. In other words, hot air blowing constitutes a process for heating and shaping, and cold air blowing performs a solidifying process.

In any event, the shaping and restraining frame 15 (or 11) used in the present invention can be a light weight and inexpensive member such as a basket made of wire mesh or wire netting, or a transparent cage, because low or very low pressure is enough to cause the reactive polyurethane compositions used in this invention to foam and expand as described hereinafter. This means that the necessity for heavy and expensive molds conventionally employed in the art can be eliminated from the process for manufacturing the foamed articles. And the labor and investment can also be remarkably reduced.

The basket-like frame or transparent cage as mentioned above can be used continuously in the subsequent steps including pouring and foaming of the polyurethane composition, and heating and shrinking of the backing material.

Prior to pouring polyurethane, the pre-shaped cover 20 is closed at its bottom. Where the final article is a head rest, the pre-shaped cover 30 may be provided therein with inserts such as reinforcing members, core members, fittings or the like. An example of such inserts is shown at 25 in FIG. 5. This insert 25 comprises a base 26, and a core member 27 supported by legs 28 extending outwardly through the base 26. The core member 27 and each upper half of the legs 28 are to be contained within the shaped cover 20, and the base 26 closes the bottom opening of the cover 20 and seals it. If an employed insert is not supported by legs 28 and the like but must be floating in the cover 20, a false positioning member (not shown) of the same material as the backing layer 2, i.e. polystyrene may be used to suspend such insert from the inner surface of the cover top. Where pivot points 28a of the legs 28 or other moving parts are to be included in the cover 20, protecting sleeves or wrapping films (not shown) of polystyrene or other material may be used to surround such moving parts and prevent them from being clogged with foamed polyurethane. Such protecting sleeves and films will shrink considerably and virtually disappear upon heating taken afterward to heat-shrink polystyrene backing 2, and will not injure any function of such moving parts.

Into the pre-shaped cover 20 thus closed, reactive polyurethane compositions in the liquid state are poured directly through the use of an appropriate injector or nozzle. Since the foamed polystyrene of the backing material 2 is relatively hard and of unicellular cells, it can well prevent poured liquid polyurethane from leaking out of the facing material 1.

Preferably, a pouring nozzle 30 as shown in FIG. 6 is employed in the present invention in order to supply the reactive polyurethane compositions in a desired creamy and viscous state into the cover 20. The pouring nozzle 30 is of a thin tube and can pierce the facing material 1 and the backing material 2, e.g. at the rear surface 22 thereof of the cover 20.

Figure 7:
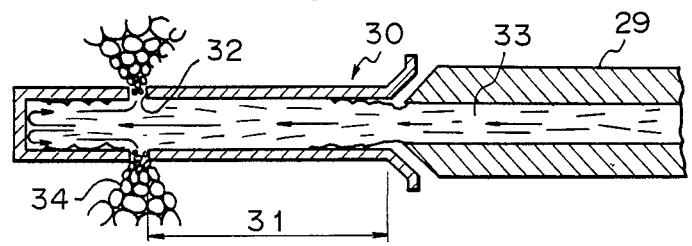
FIG. 7 shows in detail a sectional view of the pouring nozzle with its inlet connected to a supply hose.

FIG. 7 represents in greater detail a cross sectional view of the pouring nozzle 30. The nozzle 30 is composed of a thin tube having at its one end a flared inlet and a closed bottom at the other end. The flared inlet is connected with a supply conduit 29. Liquid reactive polyurethane 33 comes from supply source (not shown) through the conduit 29 into the nozzle 30. The nozzle 30 may be of plastic such as polyethylene or polystyrene. The nozzle 30 has one or more outlets 32 opening near the bottom. There is a traveling passage 31 extending between the inlet and the outlet 32. The travelling passage 31 determines a "residential time" in which the reactive polyurethane changes its state from liquid (low viscosity) to desirable high viscosity while flowing from the inlet to the outlets as indicated by arrows. In this sense, the travelling passage 31 may be called "residential passage". The reactive polyurethane is converted to creamy and highly viscous state within the residential passage 31 and is extruded through the outlet 32 to the inside of the cover as shown at 34 and overspread within the cover.

Specifically, the "residential time" during which the reactive compositions should be staying in the residential passage 31 is at least about 1 second and needs not to exceed 4 seconds in case that the preferred polyurethane composition mentioned hereinafter is employed. If the prior art polyurethane compositions such as so called "hot curing" polyurethane are used, it takes about 20 seconds to convert such compositions from liquid state to creamy state. In contrast, a creaming time for the preferred composition of the present invention is very short, and therefore the travelling passage (residential passage) 31 of the nozzle 30 can be shortened whereby the efficiency and operability of the total manufacturing process are greatly improved.

Although the length of the residential passage 31 is dependent upon the pressures exerted by the supply source of the liquid polyurethane, it is believed that the length of about 5 cm is sufficient for the under-mentioned polyurethane composition. The nozzle 30 may have a diameter of about 1 cm.

The nozzle 30 is inserted preferably horizontally into the cover 20 so as to avoid influences of gravity upon the flow of the compositions 33 and 34. Further, it is desired that the nozzle 30 be positioned so as to insure that the creamy composition 34 would not contact a localized portion of the inner surface of the cover 20, but evenly spread all over the entire space within the cover 20.

Upon completion of pouring a predetermined amount of the reactive polyurethane composition, the nozzle 30 is removed from the cover 20. The resiliency of the surface material 1 and the backing material 2 will restore a hole pierced therein by the nozzle 30, but if necessary a closing member such as a tape may be applied to such hole portion.

An example of the preferred polyurethane composition to be poured within the pre-shaped cover of the invention is as follows:

| Components | Parts by weight |
| --- | --- |
| Polyol (molecular weight 6000) | 70.00 |
| polyol (molecular weight 4000) | 30.00 |
| water | 2.80 |
| amines | 1.00 |
| chain extender | 0.50 |
| surfactant | 1.50 |
| cell opener | 4.00 |
| TDI/MDI* 80/20 (%) | 45.00 |

*TDI:toluenediisocyanate MDI:methyldiphenyldiisocyanate

This composition is highly reactive and able to attain a high degree of polymerization in a few seconds. Thus, the composition poured through the nozzle 30 will foam and expand to fill the interior of the cover 20 as shown at 35 in FIG. 6 shortly after removing of the nozzle 30. This composition can expand at a very low internal pressure so that the cover 20 with the backing 2 of impermeable foamed polystyrene layer will not be ruptured by an expanding pressure of the polyurethane foam. However, for greater safety purpose, the backing 2 may have perforated pin holes (not shown) for releasing internal gases resulting from the expansion of the polyurethane.

Figure 8:
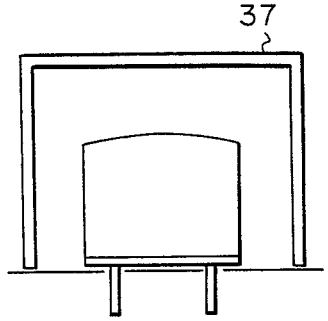
FIG. 8 illustrates heating process for causing the backing material to shrink and virtually disappear.

When the polyurethane foam 35 has expanded to fill substantially the entire space within the cover 20, the nearly finished product is subjected to a heating process for diminishing and virtually extinguishing the backing layer 2. Heating is externally applied to bring the backing material 2 to its softening or melting point of about 110°-130° C. FIG. 8 illustrates a heating furnace 37 containing the nearly finished product. Alternatively, heating wires may be wrapped around the frame 15 shown in FIG. 4 and an electrical current may be passed through the wires in this heating process.

Figure 9:
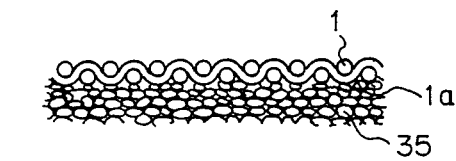
FIG. 9 depicts a partial enlarged cross section of the nearly finished article showing linkages between a surface fabric and a foamed body after the backing material disappeared.

By externally heating, the backing material 2 of polystyrene is melted and extremely shrunk to one tenth or even one hundredth of its original size so that it may be considered to virtually disappear. At this point, the polyurethane foam 35 reaches the inside surface 1a of the fabric 1 of the pre-shaped cover 20 as shown in FIG. 9 and still continues to expand and press the cover outwardly until it finally cures. The expanding polyurethane 35 is stil in sufficient tacky condition to strongly adhere to the inside 1a, but it loses almost of all its fluidity so that it will not soak out of the fabric 1.

As an alternative, the backing material 2 of foamed polystyrene may be provided with a plurality of small holes 4 as shown in FIG. 1A. In such case, portions of the expanding polyurethane foam 35 still in tacky state are permitted to pass through these holes 4 to reach the inside 1a of the cover before disappearance of the backing material 2. This insures making a positive and mechanical linkage between the fabric 1 and the foam 35. It is apparent that these holes 4 may also be useful for releasing gas from the interior of the cover.

Since the composition employed in the present invention has an extremely high reaction rate, it reaches a highly polymerized condition very rapidly, for example, within 5 seconds in case of a 5 liter cover, or in 12 seconds in case of 20 liter cover. Accordingly, the foamed body 35 conforms to the pre-shaped cover very soon, and it can be removed from the restraining frame 15 in a very short period without fear that its outer configuration might be destroyed. At the time the polymerization reaction of the configured foamed mass 35 exceeds 90% of the maximum degree within 15 minutes, the nearly finished product can be handled manually or in an automatic machinery to be conveyed to subsequent stages, e.g. packaging station whereby operational time can be considerably reduced.

Figure 10:
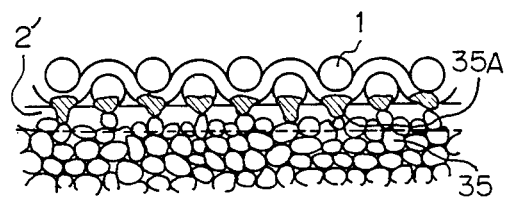
FIG. 10 depicts a similar partial cross section of another embodiment of the invention.

FIG. 10 illustrates a modified form of the invention in which a mixed foam of polystyrene and polyethylene is employed as a backing layer applied onto the facing material 1. The backing layer of mixed foam is softer and more pliable than the backing material of only polystyrene and easier to handle in the sewing operation of cover 1. Moreover, the mixed foam backing enjoys an additional advantage in that stronger linkages are produced between the cover fabric and foamed polyurethane after such backing layer was heated. That is to say, when heated, cell structures in the mixed backing layer 2' are divided into polyethylene beads and polystyrene beads, and the latter are readily shrunk and dissipated to leave holes in the remaining polyethylene layer through which portions 35A of the foaming polyurethane 35 pass to reach and adhere to the inside 1a of the fabric 1. The polyethylene layer 2' remains in a liquefied state between the fabric 1 and the polyurethane foam body 35. Again, it is preferable that the mixed foam backing is provided with pin holes for air releasing

INDUSTRIAL APPLICABILITY

According to the invention, the pre-shaped cover can hold its final shape by itself and be supported by simple, light and see-through frame or cage over several processing stages whereby the use of heavy and massive molds of conventional type is eliminated. Further, visual inspection can be easily done through the supporting frame or cage in order to ascertain whether the pre-shaped cover received in the frame holds its desired final shape even immediately before pouring the polyurethane liquid. Therefore, in the present invention, it is most unlikely to proceed to pour the polyurethane into mal-shaped cover, whereas the conventional mold does not permit any visual inspection after setting the fabric in the mold and closing the lid of the mold so that the risk of defective products is always involved. In the present invention, if a mal-shaped cover is found before commencing pouring of polyurethane, it can be easily removed from the supporting frame or cage and returned to the shaping station where the mal-shaped cover is again subjected to heating for re-shaping purpose and corrected to its proper configuration. Thus, savings of material can be attained in the invention.

We claim:

1. A process for manufacturing a foamed article without use of a mold, comprising the steps of:
   (a) preparing a cover composed of a facing material and a foamed backing material having a low melting point applied to the inner surface of said facing material, said cover having a shape substantially corresponding to a desired final contour of the article;
   (b) heating said backing material to its softening temperature or its vicinities to plasticize said backing material;
   (c) blowing air to the inside of said plasticized backing material, for pressing outwardly and inflating said backing material so as to conform said inflated cover to the final contour of the article and for hardening the backing material of the final contour to obtain a pre-shaped cover;
   (d) placing a desired insert inside said pre-shaped cover and sealing an open end thereof;
   (e) inserting a pouring nozzle having a predetermined length of residential passage into said sealed pre-shaped cover, and pouring a predetermined amount of reactive polyurethane composition through said nozzle to the inside of said cover;
   (f) allowing the poured composition to foam and expand to fill substantially an entire space within the cover, and then externally heating said cover up to around the melting point of said backing material to significantly shrink the backing material; and
   (g) allowing the foaming polyurethane composition to further expand to adhere to the inner surface of the facing material thereby to obtain a foamed article with the pre-shaped cover integrally enveloping the polyurethane foam.

2. A process according to claim 1, wherein said cover preparing step includes,
   applying firstly said foamed backing material onto one surface of said planar facing material,
   cutting out said facing material in accordance with the configuration of the final article, and then
   sewing up said facing material so as to face said one surface inward to obtain said cover lined with said backing material.

3. A process according to claim 1, wherein said cover preparing step includes,
   cutting firstly said facing material in accordance with the configuration of the final article,
   sewing up said cut facing material, and then
   lining the inner surface of said sewn facing material with said foamed backing material.

4. A process according to claim 2 or 3 wherein said foamed backing material is a foamed polystyrene which is bonded directly or via adhesives to the inner surface of said facing material.

5. A process according to claim 2 or 3 wherein said foamed backing material is a mixed foam of polystyrene and polyethylene which is bonded directly or via adhesives to the inner surface of said facing material.

6. A process according to claim 4 wherein pin holes are bored through said backing material for air releasing.

7. A process according to claim 2 or 3 wherein said cover is sewn into a substantially rectangular parallelepiped configuration corresponding to the final article which is a head rest.

8. A process according to claim 1 wherein said heating of the backing material is accomplished by using an electric heater.

9. A process according to claim 1 wherein said steps of heating the backing material and blowing air are accomplished by blowing hot air to the inside of the cover to inflate the cover to the final contour of the article, and then blowing cold air to the inside of the cover to harden the inflated backing material.

10. A process according to claim 1 wherein while blowing air to the inside of said plasticized backing material, the outer surface of said cover is inwardly suppressed by a restraining frame having a configuration corresponding to the final contour of the article.

11. A process according to claim 1 wherein a false mounting member of polystyrene foam is employed inside the pre-shaped cover for attaching said inserts.

12. A process according to claim 1 wherein said reactive polyurethane composition has fast reactivity and low foaming pressure.

13. A process according to claim 12 wherein said reactive polyurethane composition is discharged to the inside of said pre-shaped cover after reaching sufficient high viscosity within said residential passage of said pouring nozzle.

14. A process according to claim 4 wherein said external heating sufficiently shrinks said polystyrene backing material to allow that foaming and expanding polyurethane composition to reach to and adhere directly to the inner surface of the facing material.

15. A process according to claim 4 wherein said polystyrene backing material is preliminarily provided with small hoes through which said foaming and expanding polyurethane composition can reach to the inside surface of the facing material before said significant shrinkage of the backing material.

16. A process according to claim 5 wherein upon externally heating of said mixed foam backing material the polystyrene is significantly shrunk to leave a number of holes in the polyethylene layer which is changed into viscous and tacky state.

17. A process according to claim 5 wherein pin holes are bored through said backing material for air releasing.

18. A process according to claim 7 wherein while blowing air to the inside of said plasticized backing material, the outer surface of said cover is inwardly suppressed by a restraining frame having a configuration corresponding to the final contour of the article.

* * * * *

UNITED STATES PATENT AND TRADEMARK OFFICE
CERTIFICATE OF CORRECTION

PATENT NO. : 4,925,508

DATED : May 15, 1990

INVENTOR(S) : Fumio Goto and Taro Ogawa

It is certified that error appears in the above-identified patent and that said Letters Patent is hereby corrected as shown below:

Column 3, line 67, "the cover" should read --the sealed cover--.

Column 8, line 56, "stil" should read --still--.

Column 8, line 64, "1a" should read -- 1$a$ --.

Column 9, line 22, "cover 1" should read --cover 5--.

Column 12, line 5, "hoes" should read --holes--.

Signed and Sealed this

Seventeenth Day of March, 1992

Attest:

HARRY F. MANBECK, JR.

*Attesting Officer*  *Commissioner of Patents and Trademarks*